United States Patent [19]

Williamson

[11] 3,918,191
[45] Nov. 11, 1975

[54] NIGHT-TIME FISHING ALARM
[76] Inventor: John J. Williamson, 44 Signal Hill Blvd., Belleville, Ill. 62223
[22] Filed: July 29, 1974
[21] Appl. No.: 492,426

Related U.S. Application Data
[62] Division of Ser. No. 366,415, June 4, 1973, abandoned.

[52] U.S. Cl. ................ 43/17; 240/6.4 F; 240/52.5
[51] Int. Cl.² .......................................... A01K 97/12
[58] Field of Search... 43/17, 25; 24/81 CR, 81 AD, 24/81 BA; 240/6.4 F, 52.5, 58

[56] References Cited
UNITED STATES PATENTS
2,224,471  12/1940  Burgin ................................ 43/17
2,302,337  11/1942  Mantell ............................... 43/17
2,464,309  3/1949   Harshman .......................... 43/17
3,696,546  10/1972  Ambrose ............................ 43/17

Primary Examiner—Louis G. Mancene
Assistant Examiner—Daniel J. Leach
Attorney, Agent, or Firm—F. Travers Burgess

[57] ABSTRACT

According to the invention, a visual fishing alarm is provided in which an electric light source is automatically energized responsive to a strike or bite by a fish. The device is secured to a flexible fishing pole which flexure is responsible for energizing the light source. The means securing the device to the pole permits variation in the angularity of the device with respect to the pole.

5 Claims, 9 Drawing Figures

NIGHT-TIME FISHING ALARM

This is a division of application Ser. No. 366,415 filed June 4, 1973, now abandoned.

BACKGROUND OF THE INVENTION

1. Field of the Invention

This invention relates to means for notifying a fisherman at night that a fish has struck or is biting. It relates particularly to a visible alarm mechanism which is automatically actuated by the fish and requires no discreet manipulation, maneuver or special skill by the user.

2. Prior Art

Various means have been employed to signal a fish strike at night. Means previously used utilize conventional bobbers with fluorescent finishes which operate similar to daytime bobbers, but require intense concentration by the user and depend on ambient light. Other methods include focusing a flashlight beam on a conventional bobber or skillfully keeping the pole and line taut to detect the pull of a strike.

SUMMARY OF THE INVENTION

An object of the invention is to provide a fisherman with means to detect at night a fish strike or bite.

Another object is to provide automatic detection, requiring no discreet action or additional manipulation by the fisherman.

A further object is to provide a detection device which is readily adaptable to different modes of fishing, such as float, pole and rod fishing.

Additional features of the invention are lightness, ruggedness and compactness, which are essential to its purpose. These features provide portability along with other tackle box equipment, requiring no special handling techniques.

Another feature of the invention is the provision of ready access to the limited life components of the device, i.e., battery and lamp, to permit easy replacement and service.

Another feature of the invention is the absence of moving parts. This provides a high degree of reliability not possible with conventional techniques when exposed to water environments.

DETAILED DESCRIPTION

Figure 1:
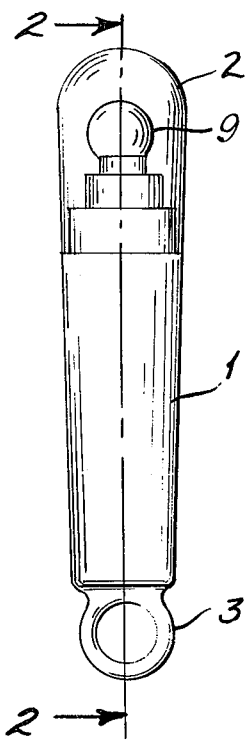
FIG. 1 is a side elevational view of the alarm device.
Figure 2:
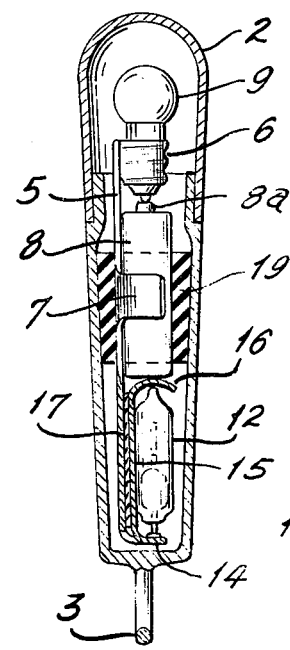
FIG. 2 is a vertical sectional view of the device, taken along line 2—2 in FIG. 1.
Figure 3:
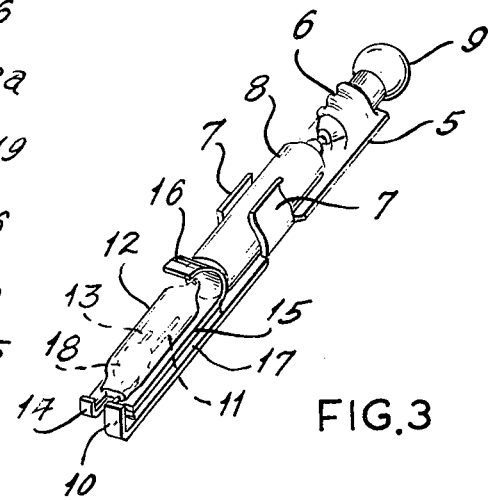
FIG. 3 is a perspective view of the device with the case removed.

Referring to the accompanying drawings which form a part of this disclosure, the alarm device includes a waterproof case comprising a slightly tapered but nearly cylindrical body 1 and a cap 2. Body 1 is open at its wide upper end and closed at its lower end, and protective transparent cap 2 may be sealingly secured to the upper end of body 1 by screw threads or friction fit. Body 1 is formed at its lower extremity with an eye 3 to provide for fish line attachment. Cap 2 and body 1 are preferably formed of transparent thermoplastic material.

Within case 1, 2 an operating assembly comprises an elongated mounting member 5 of conductive material, formed with a threaded lamp-receiving socket 6 at its upper end and a pair of transversely extending battery-gripping tabs 7 intermediate its ends. A dry cell battery 8 is secured to member 5 by tabs 7 with its positive terminal 8a projecting upwardly, and a standard incandescent lamp bulb 9 is held by its screw base in socket 6, with its central contact in engagement with battery positive terminal 8a. At its lower end, mounting member 5 is bent at a right angle to form a tab 10 to which is conductively secured one of the electrodes 11 of a mercury switch 12. The other electrode 13 of mercury switch 12 is conductively secured to a similar tab 14 on the lower end of a contact member 15, the upper end of which is shaped as at 16 for abutting engagement with the negative base of battery 8. Contact member 15 is insulated from mounting member 5 by a dielectric member 17, preferably a strip of double-coated pressure-sensitive plastic tape.

With the arrangement above described, it will be evident that bulb 9 will be energized only when mercury 18 in switch 12 is in engagement with both switch electrodes 11 and 13, thereby closing the switch and completing the circuit.

Such closure of switch 12 occurs whenever the device is inverted or while its lamp-mounting end is uppermost. Switch 12 is open when lamp 9 is positioned below horizontal. Mounting member 5 and contact member 15 are preferably formed of either heat-treated and plated steel sheet or of hardened brass sheet, to allow soldering of the terminals of switch 12 and to provide spring retention of and contact with battery 8.

The assembly is retained within body 1 by frictional fit when cap 2 is secured on body 1. Additional retention and shock protection is provided by surrounding the battery and its mounting tabs at least partially with a cushion 19 which may be formed of flexible urethane. Ballast adjustment is accomplished by longitudally positioning the assembly within body 1 prior to securing cap 2 to body 1.

Figure 5:
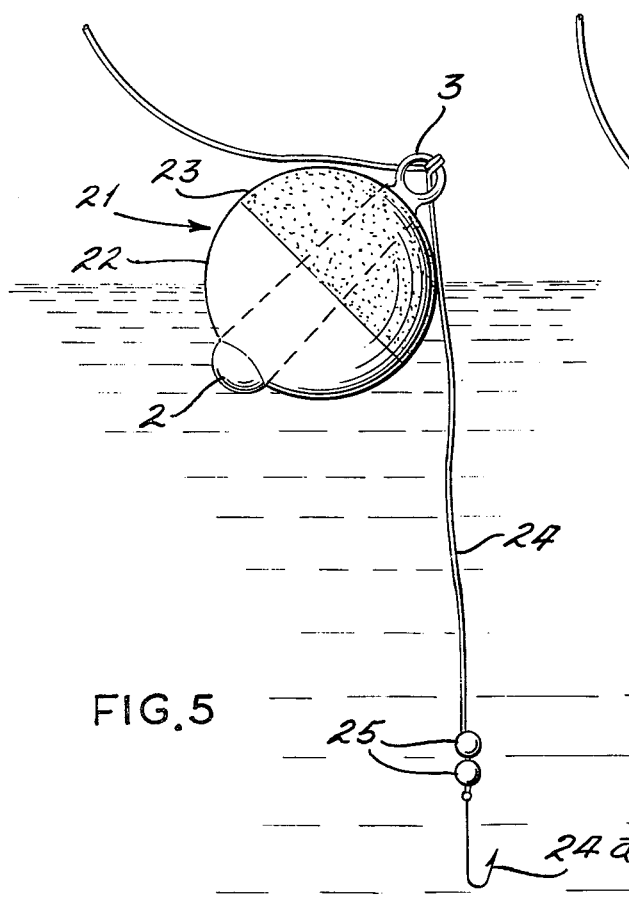
FIG. 5 shows a bobber in which the device is mounted as deployed for fishing.
Figure 6:
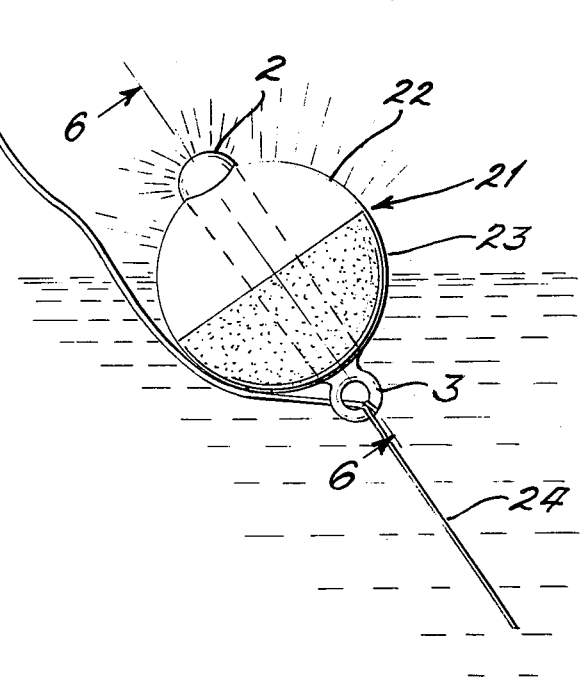
FIG. 6 shows the position of the bobber when bait is struck by a fish.
Figure 4:
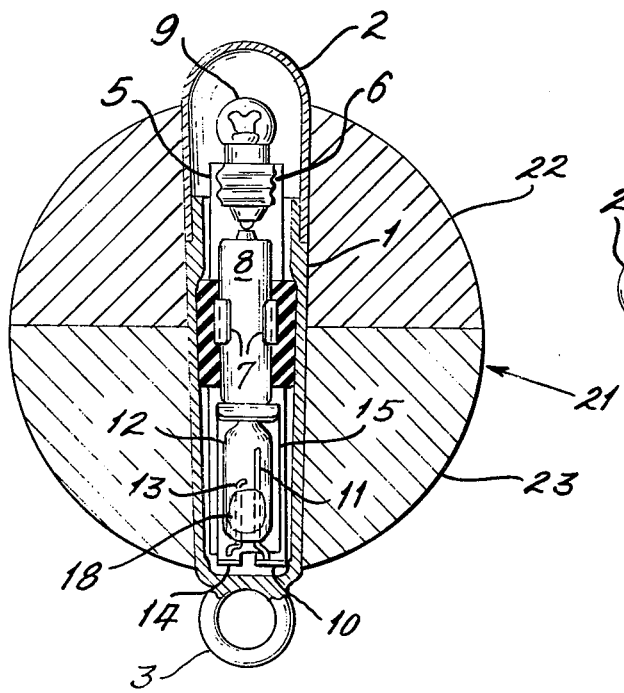
FIG. 4 is a view of the device mounted in a bobber or float.

The alarm device may be used with a float or bobber 21 as shown in FIGS. 4–6, in which the tapered body 1 and cap 2 are inserted into the float or bobber through a mating hole providing an interference fit. Preferably the float is divided along a diametral plane normal to the alarm device into a translucent lower half 22 and an opaque upper half 23. This can be effected by forming the float of separate translucent and opaque hemispheres, or the float can be a solid sphere partially painted to provide an opaque section 23. Additional ballast adjustment may be made by varying the respective densities of translucent and opaque sections 22 and 23 or by forming lightening holes in the translucent or opaque sections.

When float 21 is placed in water its opaque section 23 and eye 3 of the alarm device will be upright. Fish line 24 is secured to eye 3 and terminates in hook 24a. Sensitivity of the float may be adjusted by lead weights 25 attached to line 24 in addition to ballast adjustments as described previously. Switch 12 is open until line 24 is pulled by a fish biting bait on hook 24a, thus inverting float 21. When this occurs switch 12 closes, turning on lamp 9, which causes cap 2 and translucent section 22 of float 21 to glow.

Figure 8:
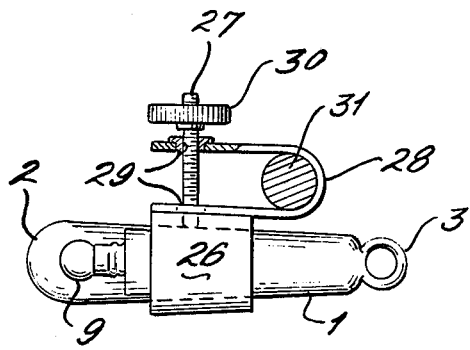
FIG. 8 is a view, enlarged and partially sectionalized, taken along line 8—8 of FIG. 7, showing the mounting of the device on a pole or rod.
Figure 9:
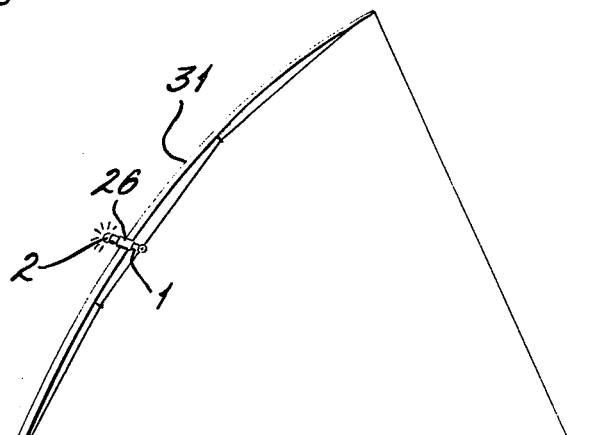
FIG. 9 shows the deflection of the pole or rod when the bait is struck by a fish.
Figure 7:
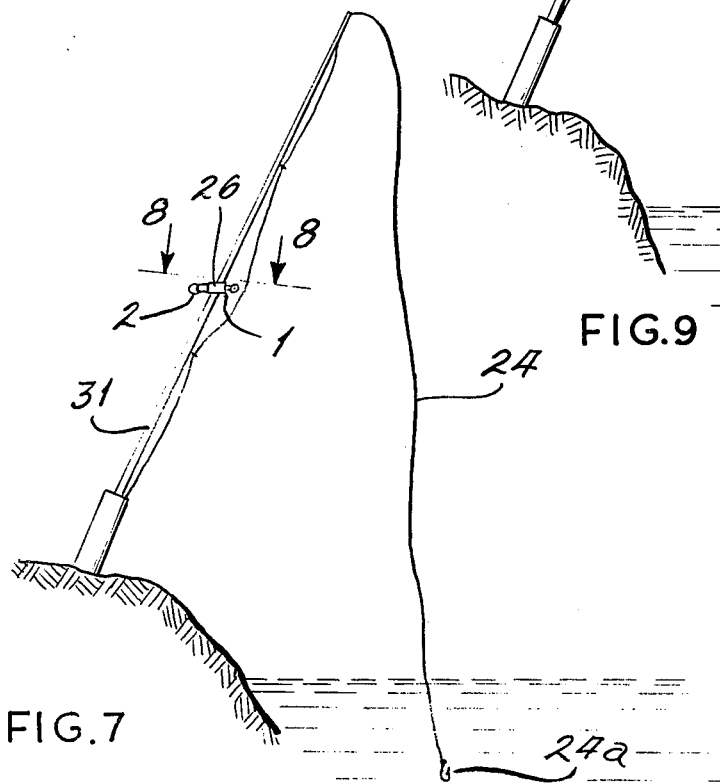
FIG. 7 is a view of the device mounted on a pole or rod by a swivel clamp.

The alarm device may also be used with a pole or rod in the manner shown in FIGS. 7–9 in which alarm device 1, 2 is inserted in annular bracket 26 which provides an interference fit for retention of the device. Threaded stud 27 is secured permanently to bracket 26 and a U-shaped clamp 28 is mounted on stud 27 via two clearance holes 29 and is secured thereon by knurled nut 30. The device is attached to pole 31 which passes through clamp 28 by tightening nut 30, with bracket 26 positioned relative to clamp 28 and pole 31 such that the alarm device is nearly horizontal but with switch 12 open. Sensitivity may be adjusted by varying the angularity of the alarm device with respect to horizontal by pivoting bracket 26 on clamp 28 while keeping switch 12 open. When pole 31 is deflected by a fish strike, switch 12 closes, turning on lamp 9. Lamp 9 will blink as pole 31 is deflected back and forth from normal position. Materials for bracket 26, stud 27, clamp 28 and nut 30 may be thermoplastic or metallic, or a combination of both.

While I have shown and described a present preferred embodiment of the invention, it is to be distinctly understood that the invention is not limited thereto but may be otherwise variously embodied within the scope of the following claims.

I claim:

1. Signal means including a device having a normally deenergized electrically actuated light source, means for securing said device directly to a flexible pole, means responsive solely to flexure of said pole for energizing said light source whereby during flexure of said pole said light will flash, said securing means being constructed to permit variation of the angularity of said device with respect to said pole and comprising an annular bracket for receiving said device, a threaded stud secured to said bracket and extending radially therefrom, a U-shaped clamp rotatably mounted on said stud via two clearance holes in its extremities, and a nut on said stud outwardly of the outer extremity of said clamp, said pole passing through said U-shaped clamp.

2. Signal means according to claim 1 wherein said energizing means comprises a source of electric energy and a normally open switch of the conductive liquid type.

3. Night-time fishing alarm means according to claim 2 wherein said switch comprises a sealed enclosure, a pair of electrodes therein spaced from each other and connected respectively to said energy source and to said light source, said conductive liquid normally being spaced from at least one of said electrodes and flowable into conductive engagement with both said electrodes when the position of said device is shifted by a fish engaging the hook.

4. Night-time fishing alarm means according to claim 3 wherein said alarm device includes a waterproof case enclosing said energy source, switch and light source, at least a portion of said case being translucent to permit visibility of said light source.

5. Signal means according to claim 4 wherein said waterproof case is of elongated generally cylindrical shape, slightly tapered lengthwise.

* * * * *